(12) United States Patent
Reischer et al.

(10) Patent No.: US 12,319,237 B2
(45) Date of Patent: Jun. 3, 2025

(54) SHELF FOR A VEHICLE

(71) Applicant: Lisa Dräximaier GmbH, Vilsbiburg (DE)

(72) Inventors: Franz Reischer, Unterdietfurt (DE); Helmut Zagler, Langquaid (DE)

(73) Assignee: LISA DRÄXLMAIER GMBH, Vilsbiburg (DE)

( * ) Notice: Subject to any disclaimer, the term of this patent is extended or adjusted under 35 U.S.C. 154(b) by 126 days.

(21) Appl. No.: 17/829,411

(22) Filed: Jun. 1, 2022

(65) Prior Publication Data

US 2022/0379812 A1    Dec. 1, 2022

(51) Int. Cl.
*B60R 7/04* (2006.01)
*B60J 5/04* (2006.01)

(52) U.S. Cl.
CPC ............ *B60R 7/046* (2013.01); *B60J 5/0468* (2013.01)

(58) Field of Classification Search
CPC ........... B60R 7/046; B60R 7/04; B60J 5/0468
USPC .................................................. 296/37.13, 31
See application file for complete search history.

(56) References Cited

U.S. PATENT DOCUMENTS

| | | | |
|---|---|---|---|
| 6,749,079 B2 * | 6/2004 | Katagiri | B60R 7/04 220/345.2 |
| 10,363,878 B1 * | 7/2019 | Lee | B60R 7/046 |
| 11,414,019 B2 * | 8/2022 | Höppel | B60R 7/02 |
| 2021/0114527 A1 * | 4/2021 | Tettenborn | B60R 7/046 |

FOREIGN PATENT DOCUMENTS

| | | | | |
|---|---|---|---|---|
| DE | 102011088377 A1 * | 6/2013 | | B60R 7/005 |
| DE | 202015106896 U1 * | 3/2016 | | B60R 13/02 |
| DE | 102018203221 A1 * | 9/2019 | | |
| EP | 1861289 B1 * | 7/2011 | | B60N 3/08 |
| KR | 100789644 B1 * | 12/2020 | | |
| KR | 20240061473 A * | 5/2024 | | |

* cited by examiner

Primary Examiner — Pinel E Romain
(74) Attorney, Agent, or Firm — BelayIP

(57) ABSTRACT

A shelf or tray for a vehicle which may be an interior trim component of the vehicle is disclosed. The tray includes a wall element and a holding element. The wall element includes a first section and a second section. The first section is at least partially mounted in a first guide device of the holding element. The first section can be latched in a defined manner within the guide device by means of at least one latching element and, by a movement of the first section and/or the second section, thus ensuring a defined opening or closing of the shelf or tray due to the latching of the latching element.

10 Claims, 4 Drawing Sheets

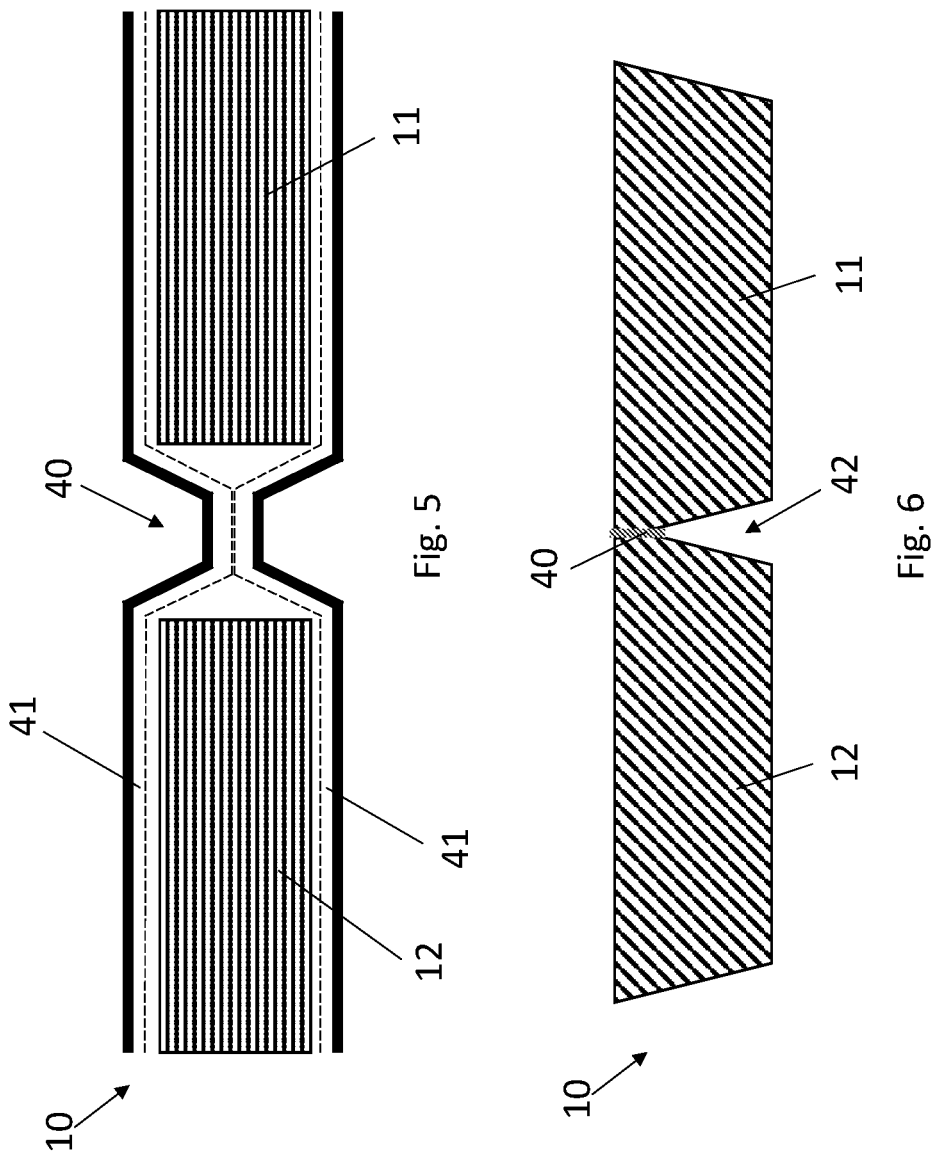

SHELF FOR A VEHICLE

CROSS REFERENCE TO RELATED APPLICATIONS

This application claims priority to German patent application 102021114154.0, filed Jun. 1, 2021, the content of which is herein incorporated by reference.

BACKGROUND OF THE INVENTION

Field of the Invention

The present invention relates to a shelf for a vehicle, such as a motor vehicle, an aircraft or a rail vehicle, and in particular to a shelf or tray, for example a map pocket, integrated into a side panel of a vehicle door in the vehicle interior. The terms shelf and tray shall be used interchangeably throughout.

DESCRIPTION OF RELATED ART

Various designs are known for storage compartments in motor vehicles in which the compartment is integrated, for example, in a side panel of a vehicle door. As a rule, storage compartments in vehicles have to meet two central requirements. On the one hand, the shelf should have the largest possible capacity, but on the other hand it should also require as little installation space as possible.

In order to adequately meet such conflicting requirements, it is known to provide trays with a variable capacity, so that the trays are thus adjustable in the size of their interior space and thus take up a large amount of installation space only when particularly full.

DE102011088377 describes such an adjustable shelf for a motor vehicle, which has a rod-shaped element that is elastic in certain areas. This forms an element defining the interior of the shelf. A first end of the rod-shaped element is fixed in a bearing, while the second end of the rod-shaped element is displaceable in a second bearing. The rod-shaped element can be transferred from a position of non-use to at least one position of use, whereby the rod-shaped element changes its contour under deformation and expands the interior space of the tray.

DE202015101858, DE102016102903 and EP1861289B1 each disclose an adjustable shelf for a vehicle or motor vehicle, with an elastic element which, when deformed, allows the stowage volume of the respective interior of the shelf to be adjusted or varied.

These adjustable prior art trays adapt the capacity of the interior of the tray to the objects stored in the tray by means of their respective elastic element. Although these known adjustable trays provide an initially satisfactory balance between the capacity provided and the required installation space of the respective tray, fragile or fragile objects in particular are exposed to the restoring force of the elastic elements in such trays and can be damaged as a result.

In addition, known adjustable shelves which are equipped with an elastic element for adjusting and limiting the interior space always have a cross-section which is at least partially circular or rounded due to the elastic deformation of the elastic element. The stowage of essentially rectangular objects is thus particularly inefficient in the utilization of the stowage volume provided here.

It is also known that elastic elements in particular can become brittle, lose their elasticity and become non-functional if they remain in a defined, tensioned position or position of the known adjustable shelves for a longer period of time.

BRIEF SUMMARY OF THE INVENTION

One task of the invention is therefore to provide an adjustable shelf using the simplest possible constructional means, which combines reliable and long-lasting use with optimum utilization of storage space.

The task is solved by the objects of the independent claims. Advantageous further embodiments of the invention are indicated in the dependent claims, the description and the accompanying figures.

A shelf for a vehicle according to the invention includes a wall member and a support member. The wall element comprises a first section and a second section. The first section is at least partially mounted in a first guide device of the retaining element. Furthermore, the first section can be locked in a defined manner within the guide device by means of at least one latching element. A movement of the first section and/or the second section ensures a defined opening or closing of the tray due to the latching of the latching element. In particular, the wall element serves to at least partially delimit an interior space of the shelf. The retaining element can also at least partially delimit the interior space of the tray. The first section is mounted in the guide device and can be latched by means of the at least one latching element. This means that the first section moves at least partially in the guide means and is lockable in its movement at at least one, preferably at several, positions defined by means of the locking element. For example, the first section can be displaceable along a plane defined by the first guide device and can be latched by means of the latching element at an opening position and at a closing position.

Alternatively, it may also be provided that the latching element is provided solely for the purpose of guiding the first section in the first guiding device. In this case, the tray preferably comprises a separate locking device which locks any positions of the first section to the holding element.

By dividing the wall element into at least a first section and a second section, different sections of the wall element can serve different purposes. For example, the first section can be primarily intended to be guided in the holding element in the guide device in order to vary the position or position of the wall element relative to the holding element. In contrast, the second section may primarily serve to delimit the interior space of the tray.

In a preferred embodiment of the invention, the sections encompassed by the wall element are mechanically interconnected so that, for example, the first section moves along with a movement of the second section and vice versa.

One or all mechanical connections between two sections can be realized in a force-fit, form-fit and/or material-fit manner, are preferably designed to be movable and can be both detachable and non-detachable.

Preferably, these mechanical connections are all designed in the same way, for example all designed as material-locking connections, although it is of course not excluded that different mechanical connections can also be realized between different interconnected sections of the wall element.

In particular, it can be provided that the tray has a symmetrical design. Accordingly, the tray can additionally comprise a third section. The third section is designed to be equivalent to the first section. The holding element thus also has a second guide device in which the third section is mounted. For this purpose, the holding element can be designed as a single component that comprises the first guide device and the second guide device, or alternatively two holding elements can be provided, each comprising a guide device.

It is possible that the latching element is arranged on the guide device or is formed by the guide device. Alternatively, it is also possible that the detent element is arranged on or formed by the first section.

In one embodiment of the tray, it may be provided that the second portion is supported within the retaining member such that the second portion is liftable to allow defined displacement of the connected first portion relative to the latching member within the guide means.

In particular, the second section can be mounted in the bearing in the retaining element in a blocking position or a release position. The second section can be moved back and forth between these two positions by means of a linear guide, for example. As long as the second section is in the blocking position, the first section connected to it cannot be moved relative to the detent element. If the second section is now moved from the blocking position to the release position by lifting it along the guide in the retaining element, the movement of the first section is released.

According to one embodiment of the invention, at least one further section is arranged between the first section and the second section. In particular, it can be provided that exactly one further section is arranged as a connecting section between the first section and the second section. In this connection, it may be provided that the sections are each mechanically connected to one another in such a way that a movable connection between the sections can be executed when the tray is opened or closed. Accordingly, it is provided that the first section is mechanically connected to the connecting section and the second section is likewise mechanically connected to the connecting section, so that the first section is mechanically connected to the second section via the connecting section.

The first section can have a recess, whereby the latching element can be moved in a defined manner within the recess. The recess in the first section serves to define with its contour a guide track along which the first section can be moved relative to the detent element. The latching element serves as a guide element that moves along the contour of the guide slot defined by the recess and thus ensures the movement of the first section in accordance with the guide slot.

In a particularly simple embodiment, the recess is designed as a linear slot, for example. The detent element can be a pin-shaped element. The first section can thus perform only a linear movement and is limited in its movement by the stop of the pin-shaped detent element at the respective ends of the guide slot. In this embodiment, the stop of the detent element at one end of the guide slot would accordingly define a detent position in which the first section is held by the detent element. A first end of the guide gate may define a first position in which the tray is open, and a second end of the guide gate may define a second position in which the tray is closed.

In an alternative embodiment, the guide track may be substantially part-circular in shape, at least in sections. Further embodiments of the guide track are also encompassed by the present invention.

According to a further embodiment of the tray, it is provided that the first section or the second section is liftable and thus the first section is displaceable in a defined manner relative to the latching element within the guide means. This means that the displaceability of the first section relative to the latching element is initially blocked, and the first section is only displaceable in a defined manner relative to the latching element within the guide device when such movement is released. Such blocking can be established in particular mechanically, for example by interlocking or wedging geometries. In this case, lifting the first section or the second section serves to release this mechanical blockage. The shelf is thus secured against unintentional adjustment of the wall element.

In a further embodiment, the shapes of the sections are matched to each other such that the second section can be moved in a defined manner and thus the tray can be opened or closed in a defined manner.

For purposes of the present invention, coordinating the shapes of the sections means that the shapes of the sections are selected such that a movement of a single section is transmitted to the other sections such that all sections move in coordination with each other for the purpose of opening or closing the tray.

Preferably, shapes that can be described in two dimensions, such as triangles or squares, are meant by the shapes, which can essentially describe the design of the sections.

However, this does not exclude the possibility that three-dimensional shapes can also be defined in order to ensure a defined opening or closing of the tray.

In a preferred embodiment, in which a further section is provided in addition to the first section and the second section, the second section may have a trapezoidal shape and the further section may be configured as a connecting section and have a triangular shape. One of the side lengths of the trapezoidal shape of the second section corresponds to one of the side lengths of the triangular shape of the connecting section, wherein the tip of the triangular shape of the connecting section points toward the longest side of the trapezoidal shape of the second section. In this embodiment, the second section is connected by its base to the retaining member. The second section is also connected by one of its legs to a first side of the connecting section. The first section is connected to a second side of the connecting section and is partially supported in the first guide means of the retaining element.

A first axis extending through the first side of the connecting section, a second axis extending through the second side of the connecting section, and a third axis extending through the base of the second section have a common point of intersection.

According to this embodiment, the tray according to the invention is opened accordingly by tilting the second section about its base with respect to the holding element, i.e. tilting about the third axis. Such a movement of the second section results in a corresponding tilting of the connecting section with respect to the holding element. Due to its triangular shape, the connecting section is also twisted about a bisector passing through the common intersection point between its first side and its second side. This twisting causes the connecting section to tilt relative to the second section and to tilt in the opposite direction relative to the first section.

Thus, in cross-section, a kind of step-like arrangement of the three sections to each other is formed.

In this scenario, the first section is correspondingly pulled out of the first guide device supporting it by areas in order to follow the second side of the connecting section, which is displaced due to the tilting.

In summary, the movements of the sections during the opening process can be described as follows: The second section tilts forward, the connecting section follows the second section and twists in the process, and the first section follows the connecting section and is pulled out of the guide device in sections.

In a symmetrical design of the tray, a second connecting section is included. The second connecting section is designed to be equivalent to the first connecting section and is arranged between the second section and the third section.

In further possible embodiments, at least the second portion and the connecting portion may of course have other shapes.

For example, an embodiment in which the second section has a triangular shape and the connecting section has a trapezoidal shape may also be conceivable.

Furthermore, it may also be provided, for example, that the connecting section has a bellows-like configuration. The connecting section thus has a deformable body, which allows the second section a corresponding relative movement for the purpose of opening or closing the tray.

Furthermore, embodiments are also conceivable in which sections of the wall element are not connected to one another in a planar manner, but only essentially at points. A section can accordingly form an at least sectionally part-circular side with which it is connected to another section. In such an embodiment, areas between sections or areas adjacent to the connection of two sections can be filled or covered by a deformable material, such as a fabric, at least in some areas, so that the wall element of the tray is correspondingly substantially closed throughout.

Another alternative embodiment may comprise that the second section is configured as a parallelogram. Equivalent to the embodiment with a trapezoidal second section and a triangular connecting section, the connecting section is also preferably triangular in shape. Accordingly, the operation of the chain of movement of the sections when opening or closing is also equivalent to the embodiment having a trapezoidal-shaped second section and a triangular-shaped connecting section. The embodiment with a second section as a parallelogram differs substantially from the embodiment with a second section as a trapezoid in that in the embodiment with the second section as a parallelogram, symmetry of the entire tray cannot be established.

In a further embodiment of the invention, an elastically deformable connecting element is arranged between at least the first section and the second section or the first section and the further section, so that a hinge-like relative movement is realized between at least the first section and the second section or the first section and the further section with deformation of the connecting element.

In this context, a hinge-like relative movement is to be understood as an articulated movement between at least the first section and the second section or the first section and the further section of the wall element about an articulation axis.

According to a supplementary embodiment, the elastically deformable connecting element between at least the first section and the second section or the first section and the further section is made by means of a lamination of at least the first section and the second section or the first section and the further section. The space between at least the first section and the second section or the first section and the further section is filled exclusively by the lamination.

In particular, the lamination can consist of a leather at least in sections. Alternatively, of course, a synthetic leather or the like is also conceivable. In particular, the lamination serves both to form the function of the mechanical connection between at least the first section and the second section or the first section and the further section, and to provide a visually and/or haptically appealing surface.

It is possible to apply the lamination over the entire wall element, i.e. all sections, or only over a specific area. It is also possible to apply several different laminations. The lamination may be arranged either on the inner side, i.e. the side facing the interior of the tray, or on the outer side, i.e. the side facing away from the interior of the tray. In a supplementary embodiment, it can of course also be provided that the tray is laminated several times, so that, for example, a lamination is applied to both sides of the sections and the lamination thus encases the sections.

In particular, in an embodiment in which the sections are laminated on both sides, it may be provided that the two opposing laminations are joined together in the space between at least the first section and the second section or the first section and the further section.

That the space between at least the first section and the second section or the first section and the further section is filled exclusively by the lamination does not, of course, preclude that an adhesive layer is not also provided in the space, for example.

In an alternative embodiment, the elastically deformable connecting member between at least the first section and the second section or the first section and the further section is made by means of a thinning of material.

This means that the wall element forms interconnected sections as integral components. The demarcation of which area of this one component is a section and which area is another section is accordingly identifiable by the thinning in the material. Moreover, this thinning serves to function as the elastically deformable connecting element. The wall element thus forms so-called film hinges between at least the first section and the second section or the first section and the further section.

Thinning can be understood to mean both the introduction of less material during the manufacture of the wall element and the subsequent removal of material, e.g. by the insertion of notches.

In one embodiment, alternatively to an embodiment of the invention with an elastically deformable connecting element, a hinge is formed between at least the first section and the second section or the first section and the further section. The hinge thereby realizes a hinge-like relative movement between at least the first section and the second section or the first section and the further section.

A hinge here can be a classic door hinge, a furniture hinge, a rolled hinge, a rod hinge, a cup hinge or even a multi-joint hinge.

Furthermore, a firm and a soft component can also be combined, e.g. by injection molding, to realize a kind of film hinge.

In another embodiment of the invention, the recess of the first section has different latching positions so that the latching element can be adjusted to different latching positions within the recess, thereby allowing different opening positions of the tray.

This means that the guide slot defined by the contour of the recess, in which the latching element is guided, has several ends or has at least one intermediate position between two ends. One end or intermediate position would act as a closing position, with the other ends and/or intermediate positions acting as possible opening positions.

For example, the guide contour can be essentially T-shaped, and thus have three ends in which the latching element can be latched. Furthermore, the guide slot can be substantially V-shaped or W-shaped, for example, and thus have one or more intermediate positions between two ends of the contour in which the latching element can be latched.

Latching of the latching element in a defined position is not only conceivable in one end or an intermediate position of a contour. It can also be provided that a detent position is designed at any position of the guide slot. This can be realized, for example, by a type of pocket geometry in the contour, which is designed at any position of the guide slot. The latching element can enter the pocket in a form-fitting manner and thus realize a latching at any position along the guide slot. For example, the guide track can then also be designed to be essentially O-shaped or circular in sections and allow different opening positions of the tray. Other contours of the guide track are also possible within the meaning of the present invention.

In an alternative embodiment, it is of course also possible for the guide device to have the recess.

BRIEF DESCRIPTION OF THE SEVERAL VIEWS OF THE DRAWINGS

Further advantages, features and details of the various embodiments of this disclosure will become apparent from the ensuing description of a preferred exemplary embodiment and with the aid of the drawings. The features and combinations of features recited below in the description, as well as the features and feature combination shown after that in the drawing description or in the drawings alone, may be used not only in the particular combination recited, but also in other combinations on their own, with departing from the scope of the disclosure.

An advantageous embodiment of the invention is explained below with reference to the accompanying figures, wherein:

FIG. 5 depicts a sectional view of a wall element of a tray according to the invention in a first embodiment, and FIG. 6 depicts a sectional view of a wall element of a tray according to the invention in a second embodiment.

The figures are merely schematic representations and serve only to explain the invention. Identical or similarly acting elements are marked throughout with the same reference signs.

DETAILED DESCRIPTION OF THE SEVERAL VIEWS OF THE DRAWINGS

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as including only one of A, only one of B, only one of C, or any combination of A, B, and C.

Figure 1:
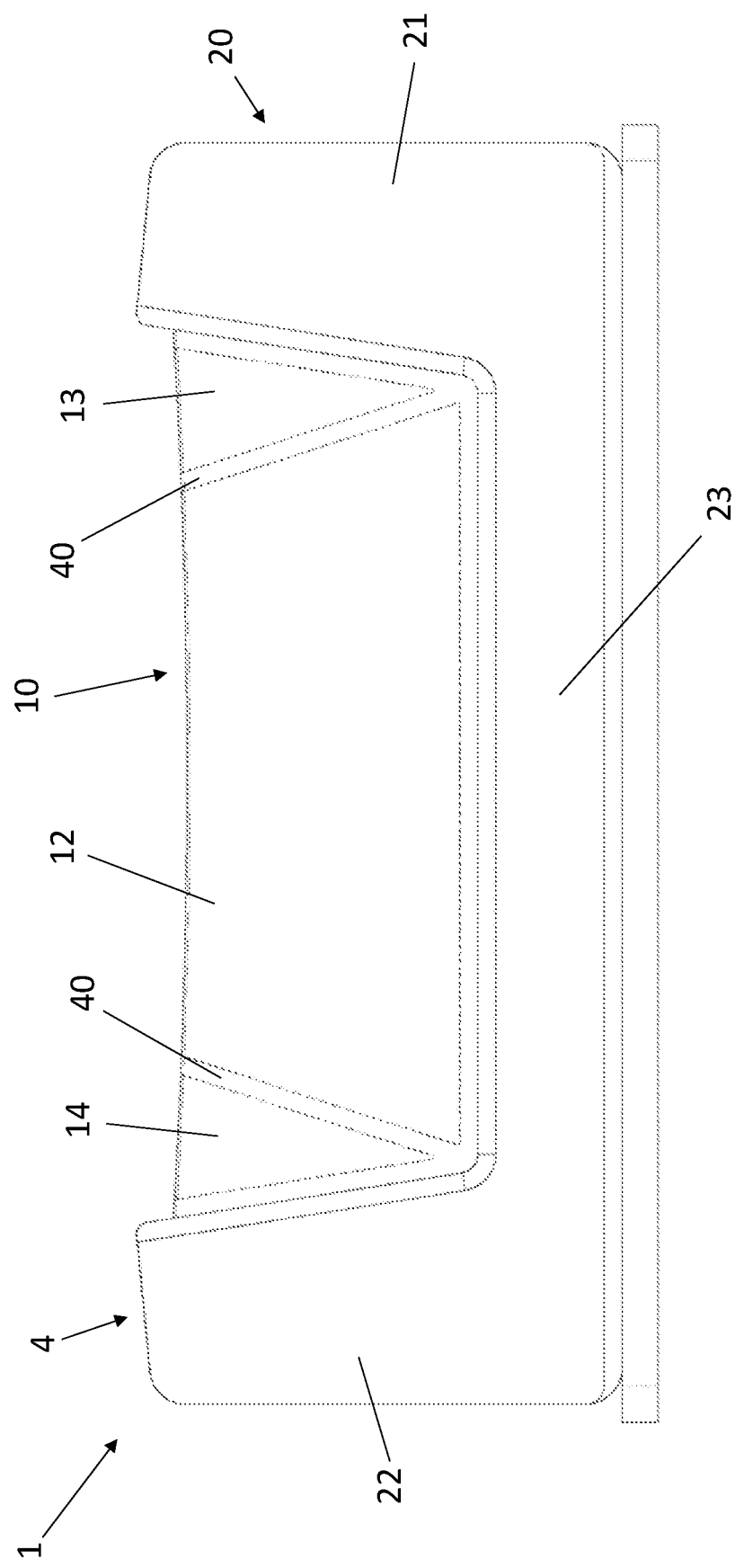
FIG. 1 depicts a front view of the tray.

FIG. 1 shows a front view of the tray 1 according to the invention. The tray 1 comprises a wall element 10 and a retaining element 20. The retaining element 20 is divided as a common component into a first area 21, a second area 22 and a third area 23. The wall element 10 comprises a plurality of sections 12, 13, 14, which are each mechanically connected to one another via a connecting element 40. The connecting element 40 thereby covers the sections 12, 13, 14, so that their contour is shown here as a dashed line for better recognition. The connecting element 40 is formed as a leather layer which covers all sections 12, 13, 14 on at least one of their sides and is mechanically connected to them there. The connecting element 40 can, for example, be laminated to the sections 12, 13, 14.

Here, the connecting element 40 allows a hinge-like relative movement between at least the first portion and the further portion (13, 14) of the wall element 10 and between the second portion 12 and the further portion (13, 14) of the wall element 10.

The shelf 1 according to the invention provides that at a first end 3 of the shelf 1 a first section (not seen here) of the wall element 10 is supported in the first area 21 of the holding element 20. Centrally on the shelf 1, a second portion 12 of the wall element 10 is connected to the third region 23 of the retaining element 20. At a second end 4 of the tray 1, a third section (not shown) of the wall element 10 is supported in the second region 22 of the retaining element 20.

A first connecting portion 13 of the wall element 10 is disposed between the first portion of the wall element 10 and the second portion 12 of the wall element 10. A second connecting section 14 of the wall element 10 is arranged between the third section of the wall element 10 and the second section 12 of the wall element 10. Thereby, the first section is mechanically connected to the first connecting section 13. The first connecting section 13 is in turn mechanically connected to the second section 12. The second section 12 is mechanically connected to a second connecting section 14 at its side opposite to the first connecting section 13. The second connecting section 14 is also mechanically connected to the third section.

This means that the tray 1 has a symmetrical structure due to the equivalent configuration of its first end 3 and its second end 4.

Figure 2:
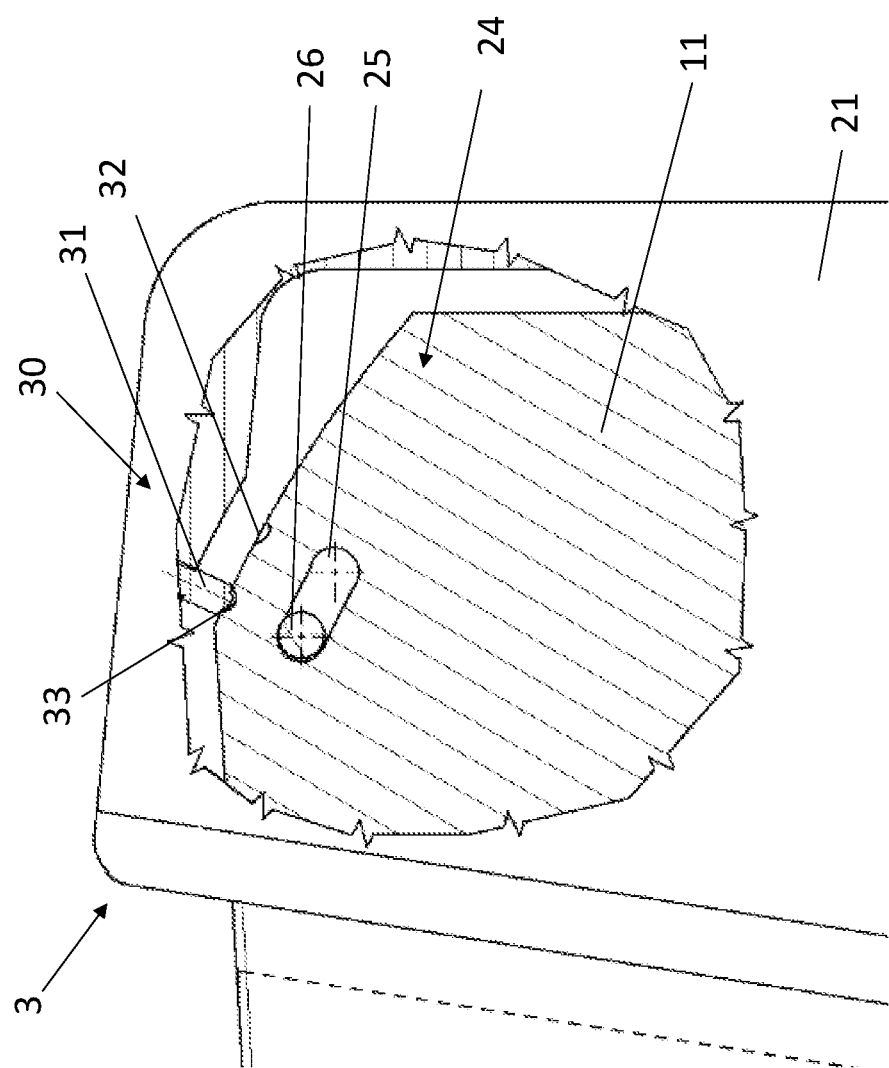
FIG. 2 depicts a partial section of the retaining element.

FIG. 2 shows a partial section of the retaining element 20, wherein the FIG. 2 shows a direct top view of the retaining element 20 and the jagged line shows an area of the first section 11 that does not have a cover layer. In this case, the partial section is located in the first region 21 of the retaining element 20, so that the first section 11 of the wall element 10 can be partially seen. In addition, the first guide device 24 supporting the first section 11 as well as a locking device 30 can be seen in FIG. 2.

The guide device 24 comprises a pin-shaped latching element 26, wherein the first section 11 forms a recess 25. The latching element 26 is arranged within the recess 25 and can be moved there in a defined manner. The contour of the recess 25 provides a guide track along which the latching element 26 can move. The recess 26 is designed here as a simple elongated hole, so that the guide slot seen here allows the detent element 26 to move linearly.

The further illustrated locking device 30 serves to hold or lock the first section 11 of the wall element 10 in a defined position. The locking device 30 comprises a pin 31 formed as an integral part of the first area 21 of the retaining element 20 and a first and a second notch 32, 33. The notches 32, 33 are formed on the outside of the first section 11 of the wall element 10.

If the first section 11 moves along the guide slot defined by the recess 25, the notches 32, 33 are also moved relative to the pin 31. When the pin 31 locks in the first notch 32, the first section 11 is locked in a first position by the positive fit of the pin 31 and the first notch 32. Equivalently, the first section 12 can also be locked in a second position when the pin 31 locks in the second notch 32.

A guide and locking of the first section 11 in the first area 21 of the retaining element 20, shown in FIG. 2, is also provided in the second area 22 of the retaining element 20 to guide and lock the third section supported there.

Figure 4:
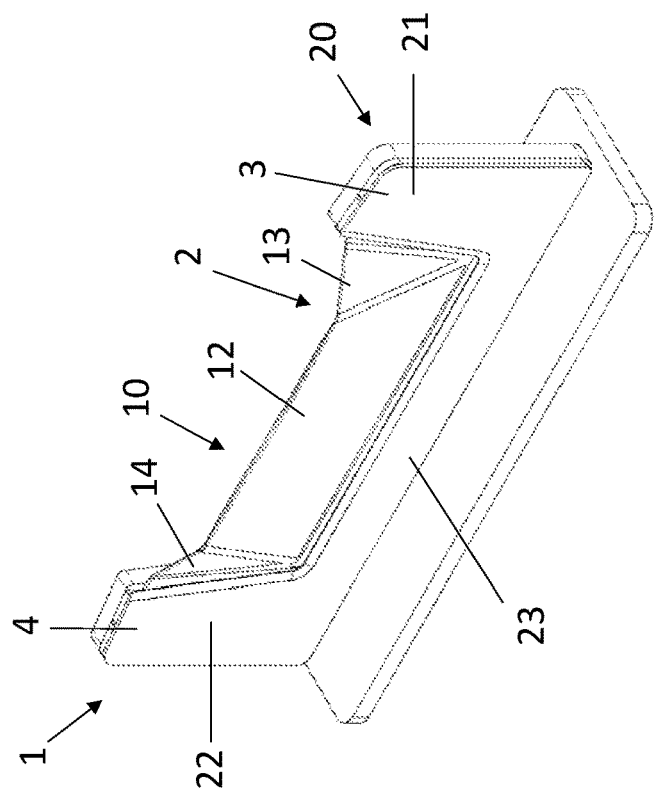
FIG. 4 depicts a perspective view of the tray in an extended position.
Figure 3:
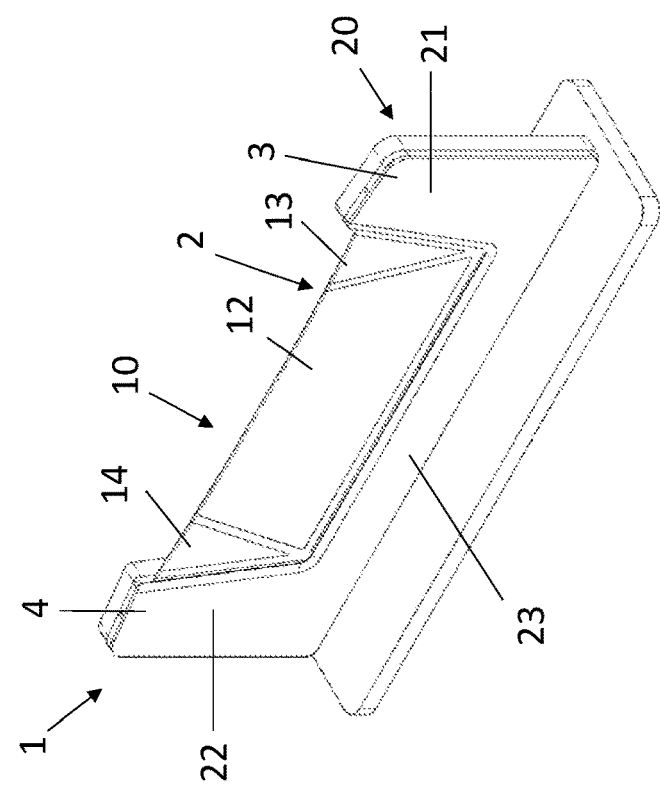
FIG. 3 depicts a perspective view of the tray in a retracted position.

FIGS. 3 and 4 show a tray 1 according to FIG. 1 in different positions. FIG. 3 shows a perspective view of the tray 1 in a closed position, whereas FIG. 4 shows a perspective view of the tray 1 in an open position.

It can be seen that the wall element 10 of the tray 1 is substantially planar in the closed position. The sections 11, 12, 13, 14 of the wall element 10 are accordingly arranged in a common plane and run substantially parallel to the regions 21, 22, 23 of the retaining element 20 guiding them. In the closed position, an interior space 2 which the shelf 1 at least partially delimits when integrated in a vehicle would be particularly small.

In contrast, the interior space 2 of the tray 1 is significantly larger in the open position. This is achieved by the fact that the shapes of the sections 11, 12, 13, 14 are matched to one another in such a way that the sections 11, 12, 13, 14 can be moved together in a defined manner and they thus vary the interior space 2 of the tray 1 in a defined manner.

Here, the second section 12 has a trapezoidal shape and the connecting sections 13, 14 have a triangular shape. In this embodiment, the second section 12 is connected by its base to the retaining element 20 and can be tilted relative to the latter. With one of its legs, the second section 12 is connected to one side of the first connecting section 13. With the other leg, the second section 12 is connected to one side of the second connecting section 14. The first connecting section 13 is connected with another side to the first section (not seen here). The second connecting section 14 is connected with another side to the third section (not to be seen here).

If it is now desired to change from the closed position according to FIG. 3 to the open position according to FIG. 4, the second section 12 is tilted forward about its base relative to the retaining element 20. Such a movement of the second section 12 results in a corresponding tilting of the two connecting sections 13, 14.

Due to their triangular shape, the connecting sections 13, 14 are also twisted. The first connecting section 13 rotates around the bisector between its side connected to the second section 12 and its side connected to the first section. The second connecting section 14 thereby rotates about the angle bisector between its side connected to the second section 12 and its side connected to the third section. Due to the symmetrical configuration of the tray 1, the connecting sections 13, 14 thereby rotate in opposite directions. As a result, the first section and the third section are moved out of their bearing in the holding element 20 towards each other in a defined manner.

In summary, the movements of the sections 12, 13, 14 during the process of opening can be described as follows: The second section 12 tilts forward, the connecting sections 13, 14 follow the second section 12 and twist in the process, and the first section as well as the third section follow the connecting sections 13, 14 and are pulled out of their respective areas 21, 22 of the retaining element 20 by areas.

FIG. 5 shows a sectional view of a wall element 10 of a tray according to the invention in a first embodiment.

A first section 11 of the wall element 10 and a second section 12 of the wall element 10 as well as a connecting element 40 are shown. The connecting element 40 comprises two elastically deformable connecting layers 41 which enclose the sections 11, 12 of the wall element 10 between them. For example, the connecting layers 41 can be made of a leather, at least in sections.

The sections 11, 12 of the wall element 10 are thereby spaced apart from each other, forming a space between the two sections 11, 12.

In this case, the connecting layers 41 are firmly connected to the sections 11, 12, e.g. by a laminating process, and are firmly connected to each other in the space between the two sections 11, 12. In this way, a mechanical connection between the sections 11, 12 is realized via the connecting layers 41. Due to the elastically deformable connecting layers 41, the mechanical connection established by the connecting element 40 allows a hinge-like relative movement between the first section 11 and the second section 12.

In this embodiment, the connecting element 40 thus realizes both the function of the mechanical connection and a visually and/or haptically appealing surface on the wall element 10, through the connecting layers 41 arranged on both sides.

FIG. 6 shows a sectional view of a wall element 10 of a tray according to the invention in a second embodiment.

Contrary to the first embodiment of the wall element according to FIG. 5, the connecting element 40 is here an integral part of the wall element 10. The mechanical connection between the first section 11 and the second section 12 of the wall element 10 by the connecting element 40 is realized in such a way that the sections 11, 12 of the wall element 10 consist of a common component and the connecting element 40 is formed as a thinning 42 in the material of the wall element 10 between the two sections 11, 12.

The shelf according to the invention provides an adjustable shelf using means that are as simple as possible in terms of design, which ensures reliable and long-lasting use and offers optimum utilization of storage space.

The figures are merely schematic representations and serve only to explain the invention. Elements that are identical or have the same effect are consistently marked with the same reference signs.

What is claimed is:

1. A shelf for a vehicle, comprising:
   a wall element comprising a first section and a second section;
   a retaining element comprising a first guide device;
   wherein the first section is at least partially mounted in the first guide device,
   wherein the first section is configured to be latched in a defined manner within the first guide device by at least one latching element,
   wherein the second section is directly and pivotably connected to the wall element; and
   wherein a movement of the first section and/or of the second section defines an opening or closing of the shelf as a result of a latching of the at least one latching element.

2. The shelf according to claim 1, further comprising at least one further section arranged between the first section and the second section.

3. The shelf according to claim 1, wherein:
   the first section further comprises a recess; and
   the at least one latching element is configured to move in a defined manner within the recess.

4. The shelf according to claim 1, wherein the first section or the second section is configured to be liftable thereby displacing the first section in a defined manner relative to the latching element within the guide device.

5. The shelf according to claim 1, wherein the sections comprise shapes which are matched to one another and configured such that the second section is movable in a defined manner and the tray is openable and closeable in a defined manner.

6. The shelf according to claim 1, further comprising an elastically deformable connecting element arranged between at least the first section and the second section or the first section and the further section, the elasticity deformable connecting element is configured such that a hinge movement movement is realized between at least the first section and the second section or the first section and the further section with deformation of the connecting element.

7. The shelf according to claim 6, wherein the elastically deformable connecting element between at least the first section and the second section or the first section and the further section comprises a lamination of at least the first section and the second section or the first section and the further section and the space between at least the first section and the second section or the first section and the further section is filled exclusively by the lamination.

8. The shelf according to claim 6, wherein the elastically deformable connecting element between at least the first section and the second section or the first section and the further section comprises a thinning of material.

9. The shelf according to claim 1, further comprising a hinge arranged between at least the first section and the second section or the first section and the further section, the hinge configured to move in a hinge movement between at least the first section and the second section or the first section and the further section.

10. The shelf according to claim 2, wherein a recess of the first section comprises different latching positions configured to set the latching element to different latching positions within the recess thereby enabling different opening positions of the tray.

* * * * *